US009697181B2

(12) United States Patent
Berlin et al.

(10) Patent No.: US 9,697,181 B2
(45) Date of Patent: Jul. 4, 2017

(54) CENTRALIZED FIELD RENDERING SYSTEM AND METHOD

(71) Applicant: III HOLDINGS 1, LLC, Wilmington, DE (US)

(72) Inventors: Suzanne Berlin, Peoria, AZ (US); Sonali Prabhakar Gupta, Pune (IN); Sitaram Inguva, Phoenix, AZ (US); Chintamani Maheshwar Chhatre, Pune (IN)

(73) Assignee: III Holdings 1, LLC, Wilmington, DE (US)

( * ) Notice: Subject to any disclaimer, the term of this patent is extended or adjusted under 35 U.S.C. 154(b) by 662 days.

(21) Appl. No.: 14/061,502

(22) Filed: Oct. 23, 2013

(65) Prior Publication Data

US 2014/0047325 A1    Feb. 13, 2014

Related U.S. Application Data

(63) Continuation of application No. 10/711,926, filed on Oct. 13, 2004, now Pat. No. 8,589,787.

(60) Provisional application No. 60/563,930, filed on Apr. 20, 2004.

(51) Int. Cl.
*G06F 17/21* (2006.01)
*G06F 17/30* (2006.01)

(52) U.S. Cl.
CPC ...... *G06F 17/211* (2013.01); *G06F 17/30908* (2013.01)

(58) Field of Classification Search
CPC ........ G06F 8/36; G06F 17/243; G06F 17/211; G06F 17/2247; G06F 17/30908
See application file for complete search history.

(56) References Cited

U.S. PATENT DOCUMENTS

| 5,860,073 | A | 1/1999 | Ferrel et al. |
| 6,012,098 | A * | 1/2000 | Bayeh ............... G06F 17/30569 707/E17.006 |
| 6,167,523 | A * | 12/2000 | Strong ................. G06F 17/243 709/219 |
| 6,569,207 | B1 | 5/2003 | Sundaresan |
| 6,654,949 | B1 | 11/2003 | Fraenkel et al. |
| 6,675,354 | B1 * | 1/2004 | Claussen ............. G06F 17/2247 715/205 |
| 6,697,849 | B1 | 2/2004 | Carlson |
| 6,728,769 | B1 | 4/2004 | Hoffmann |
| 6,917,969 | B2 | 7/2005 | Aggarwal et al. |
| 6,941,521 | B2 | 9/2005 | Lin et al. |

(Continued)

OTHER PUBLICATIONS

Notice of Allowance dated Jul. 22, 2013 in U.S. Appl. No. 10/711,926.

(Continued)

*Primary Examiner* — Wilson Tsui
(74) *Attorney, Agent, or Firm* — Meyertons, Hood, Kivlin, Kowert & Goetzel, P.C.

(57) ABSTRACT

The invention includes system for centralized rendering of user interface elements based on configurations as described in XML. A developer may create a definition for a field based on the nature of the information to be displayed to a user within a single file. Such definition will affect all future instances of the particular data type without a need to modify and/or compile code residing either within an HTML file or on a server.

15 Claims, 2 Drawing Sheets

(56) References Cited

U.S. PATENT DOCUMENTS

Figure 1:
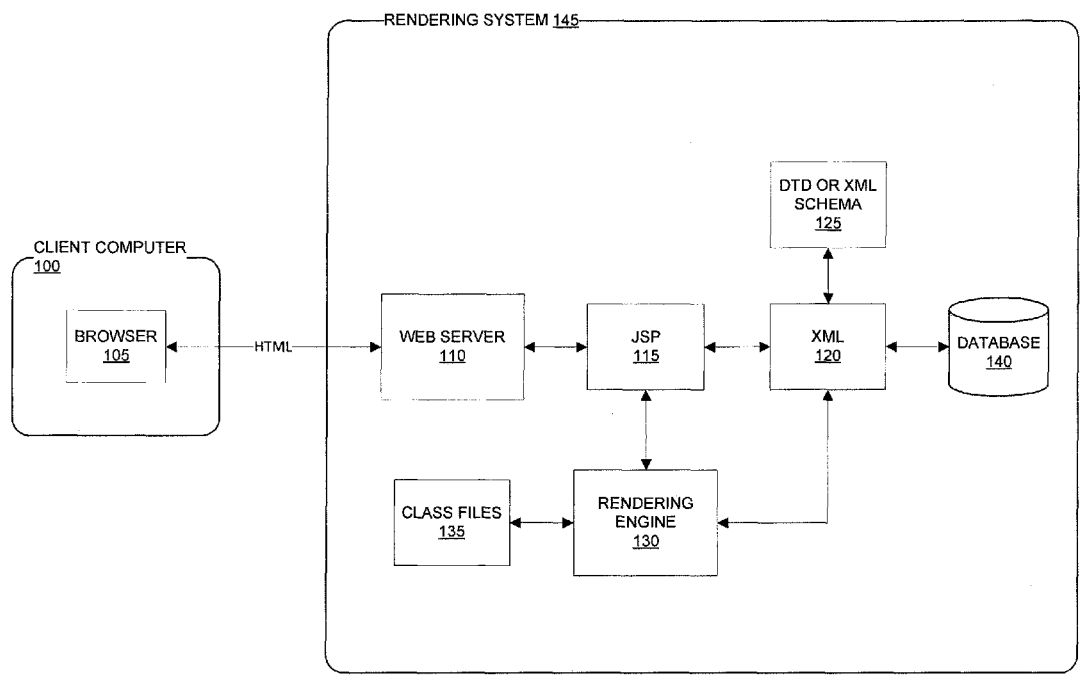

| | | | |
|---|---|---|---|
| 6,948,117 B2 | 9/2005 | Van Eaton et al. | |
| 6,990,654 B2 | 1/2006 | Carroll, Jr. | |
| 7,076,728 B2 | 7/2006 | Davis et al. | |
| 7,346,840 B1* | 3/2008 | Ravishankar | G06F 17/3089 707/E17.116 |
| 7,415,672 B1* | 8/2008 | Fortini | G06F 17/2247 715/760 |
| 7,516,145 B2* | 4/2009 | Sikchi | G06F 17/30569 |
| 8,181,164 B1* | 5/2012 | Gharavy | G06F 17/2247 717/137 |
| 2002/0026447 A1 | 2/2002 | Matsutsuka et al. | |
| 2002/0038349 A1 | 3/2002 | Perla et al. | |
| 2002/0077823 A1 | 6/2002 | Fox et al. | |
| 2002/0095441 A1 | 7/2002 | Lakhani et al. | |
| 2002/0095459 A1 | 7/2002 | Laux et al. | |
| 2002/0107915 A1 | 8/2002 | Ally et al. | |
| 2002/0111992 A1 | 8/2002 | Copeland et al. | |
| 2002/0120649 A1 | 8/2002 | Goward | |
| 2002/0123334 A1 | 9/2002 | Borger et al. | |
| 2002/0152244 A1* | 10/2002 | Dean | G06F 17/2247 715/255 |
| 2002/0178290 A1 | 11/2002 | Coulthard et al. | |
| 2002/0186248 A1 | 12/2002 | Ramanathan et al. | |
| 2003/0007014 A1 | 1/2003 | Suppan et al. | |
| 2003/0023953 A1 | 1/2003 | Lucassen et al. | |
| 2003/0050932 A1 | 3/2003 | Pace et al. | |
| 2003/0078949 A1* | 4/2003 | Scholz | G06F 17/2247 715/226 |
| 2003/0078960 A1 | 4/2003 | Murren et al. | |
| 2003/0110167 A1 | 6/2003 | Kim | |
| 2003/0110315 A1 | 6/2003 | Upton | |
| 2003/0137538 A1 | 7/2003 | Hesmer et al. | |
| 2003/0146937 A1 | 8/2003 | Lee | |
| 2003/0154239 A1 | 8/2003 | Davis et al. | |
| 2003/0188036 A1 | 10/2003 | Chen et al. | |
| 2003/0221184 A1 | 11/2003 | Gunjal et al. | |
| 2003/0225826 A1 | 12/2003 | Mckellar et al. | |
| 2003/0226106 A1 | 12/2003 | Mckellar et al. | |
| 2003/0226107 A1 | 12/2003 | Pelegri-Llopart et al. | |
| 2003/0226110 A1 | 12/2003 | Scheering | |
| 2003/0226111 A1 | 12/2003 | Wirts et al. | |
| 2003/0229683 A1 | 12/2003 | Oshima et al. | |
| 2004/0024841 A1 | 2/2004 | Becker et al. | |
| 2004/0039990 A1 | 2/2004 | Bakar et al. | |
| 2004/0041841 A1 | 3/2004 | LeMogne et al. | |
| 2004/0044961 A1 | 3/2004 | Pesenson | |
| 2004/0046789 A1 | 3/2004 | Inanoria | |
| 2004/0064822 A1 | 4/2004 | Noda | |
| 2004/0068554 A1 | 4/2004 | Bales et al. | |
| 2004/0073552 A1 | 4/2004 | Bailey et al. | |
| 2004/0073630 A1 | 4/2004 | Copeland et al. | |
| 2004/0177315 A1* | 9/2004 | Brown | G06F 17/24 715/234 |
| 2004/0189708 A1 | 9/2004 | Larcheveque et al. | |
| 2005/0028084 A1* | 2/2005 | Dziejma | G06F 17/2725 715/225 |
| 2005/0114435 A1* | 5/2005 | DiPlacido | H04L 69/329 709/202 |

OTHER PUBLICATIONS

Advisory Action dated Feb. 2, 2012 in U.S. Appl. No. 10/711,926.
Final Office Action dated Nov. 30, 2011 in U.S. Appl. No. 10/711,926.
Office Action dated Jun. 23, 2011 in U.S. Appl. No. 10/711,926.
Advisory Action dated Jun. 2, 2010 in U.S. Appl. No. 10/711,926.
Final Office Action dated Mar. 17, 2010 in U.S. Appl. No. 10/711,926.
Office Action dated Oct. 27, 2009 in U.S. Appl. No. 10/711,926.
Advisory Action dated Mar. 9, 2009 in U.S. Appl. No. 10/711,926.
Final Office Action dated Nov. 26, 2008 in U.S. Appl. No. 10/711,926.
Office Action dated May 29, 2008 in U.S. Appl. No. 10/711,926.
Advisory Action dated Mar. 17, 2008 in U.S. Appl. No. 10/711,926.
Final Office Action dated Jan. 9, 2008 in U.S. Appl. No. 10/711,926.
Office Action dated Jul. 23, 2007 in U.S. Appl. No. 10/711,926.
Final Office Action dated Apr. 5, 2007 in U.S. Appl. No. 10/711,926.
Office Action dated Jul. 28, 2006 in U.S. Appl. No. 10/711,926.
Govind Sheshadri, Understanding JavaServer Pages Model2 Architecture, Dec. 1999, Java World, pp. 1-14, http://www.javaworld.com/javaworld/jw-12-ssj-jspmvc_p.html.
Oliver Meyer, "a Tool—Creating Validated XML Documents on the fly Using MS Word", published: Oct. 23, 2002, publisher: ACM, pp. 113-121.

\* cited by examiner

CENTRALIZED FIELD RENDERING SYSTEM AND METHOD

CROSS REFERENCE TO RELATED APPLICATIONS

This application is a continuation of, claims priority to and the benefit of, U.S. Ser. No. 10/711,926 filed on Oct. 13, 2004 and entitled "CENTRALIZED FIELD RENDERING SYSTEM AND METHOD." The '926 application claims priority to, and the benefit of, U.S. Provisional Patent Application No. 60/563,930 filed on Apr. 20, 2004. Both of which are hereby incorporated by reference in their entirety.

FIELD OF INVENTION

The present invention relates generally to the presentation of user interface elements within a software application or Internet webpage, and more particularly, to a system and method for rendering fields and setting field properties in a centralized repository (e.g., an XML document) to facilitate consistent implementation and efficient development and maintenance of software user interfaces and webpages.

BACKGROUND OF THE INVENTION

Personal computer users have grown accustomed to interacting through user interface elements such as, for example, graphic representations of buttons, check boxes, text fields, menus, lists, drop-down boxes and the like. Likewise, users of the Internet are familiar with web browser applications which receive data in the form of HyperText Markup Language (HTML) and transform it into a graphical representation of the data including the user interface elements as described.

HTML has been universally adopted as the standard language used to define webpage presentation and HTML remains the core building block of websites and web applications. As expected, a number of technologies have been implemented to compliment HTML by providing functionality not available in HTML such as the ability to present dynamic content within webpages. In order to provide a mechanism to facilitate the delivery of dynamic web content, Microsoft introduced Active Server Pages (ASP). ASP is a server based technology which enables a developer to imbed a subset of the Visual Basic language, termed VBScript, within an HTML document. When a browser application submits a request to a web server for an ASP document, the server extracts and processes the VBScript which may include instructions for database transactions.

Another compliment to HTML was developed by Sun Microsystems as a subset to the Java platform. The concept behind Java Server Pages (JSP) is very similar to that of the ASP, except that with JSP, JavaScript (instead of VBScript) is imbedded within a HTML document. Like ASP, JSP documents are processed by a server, however there are a number of differences on how each is processed. Aside from the differences in processing, each produce similar results which are transmitted to a client browser in the form of an HTML data stream.

Extensible Markup Language (XML) was developed to provide a means to format data within a webpage. XML resembles HTML in appearance and structure, however XML is functionally different. HTML is used to display data, while XML is used to describe the data. XML has provided developers with a means for displaying different types of data in a consistent manner. For example, a directory service website may provide users with a means to enter a name of an individual or business into a search field. Following a database search on the name, data relating to one or more matches may include a telephone number, address, city, state, zip code and the like. In order to ensure that all telephone numbers are formatted and displayed consistently, a developer may create formatting instructions within a data type definition (DTD) file. When a data type is defined, a developer need only to add an XML tag within an HTML document which corresponds to a like tag in the DTD. The DTD tag is followed by an instruction set which explains how to format the telephone number. The same may apply to all of the other data types in the above example. Additionally, XML frees the developer from the tedious and sometimes difficult task of writing program code to format data. Formatting data may be a very time and resource consuming activity, because each occurrence of data requires logic to describe how the data is to be presented. Because data is often displayed within fields on webpages, a similar problem exists in defining field types and properties.

In a typical web-based project, the fields are implemented in the individual webpages. As such, if like fields are displayed on multiple webpages the code is often duplicated for each occurrence of the field. Any modification to a field typically requires the developer to modify all occurrences of that field throughout a website. One prior art solution was to re-use existing code for a similar field by centralizing such code. Additionally, webpages may present different views which have different purposes, such as, for example, data manipulation screens, reporting or simply displaying some information. These views typically consist of fields, which are repeated in different views in an application, wherein the fields include, for example, date of birth and Social Security number. In general, the rendering of these fields may be handled in respective webpages. However, rendering fields in different webpages often leads to repetition of code. Moreover, even though it is often a business requirement that the display of the field is substantially the same throughout the application, it is coded at multiple locations in different ways. Accordingly, any change required in display or other attributes of the field may often require a change in all the views (webpages) where the field is used. The different changes typically result in repetitive work.

Therefore, a need exists for a user interface rendering utility to assist individual developers and development teams in the construction and maintenance of software applications and Internet webpages. Further, a need exists for a system and method for managing multiple instances of a user interface control element in order to ensure consistency and universal application.

SUMMARY OF THE INVENTION

In general, the invention includes a framework for displaying different business information in web-based applications using XML, thereby providing a centralized and reusable presentation configuration. More particularly, the invention uses an XML configuration file, along with the centralized infrastructure classes, to define the fields. This definition approach does not require any re-compiling when new fields are added or changed. The invention creates a substantially consistent user experience by including a standard field definition across the entire application. The advantages of the invention include reduced development cost, faster time to market, increased quality and a better customer experience due to a consistent user interface.

In one exemplary embodiment, the system may include credit card application processing software in which a user may apply for a card online. The user may apply for two types of cards, namely a credit card and a charge card. During the application process, a field such as Personal Annual Income is shown to the user in both the applications. In both applications, the Personal Annual Income field is represented as a dropdown box and the display is handled separately in the respective webpages. If the business desires a change to this field to create a text box, then both webpages would need to be changed. However, with the present invention, the system reuses and stores the logic of rendering the field at a centralized location such that each webpage uses the utility of the present invention for displaying the field. In this manner, the logic is stored in a central location, and in case of any change, only one centralized change is needed.

BRIEF DESCRIPTION OF EXEMPLARY DRAWINGS

Figure 2:
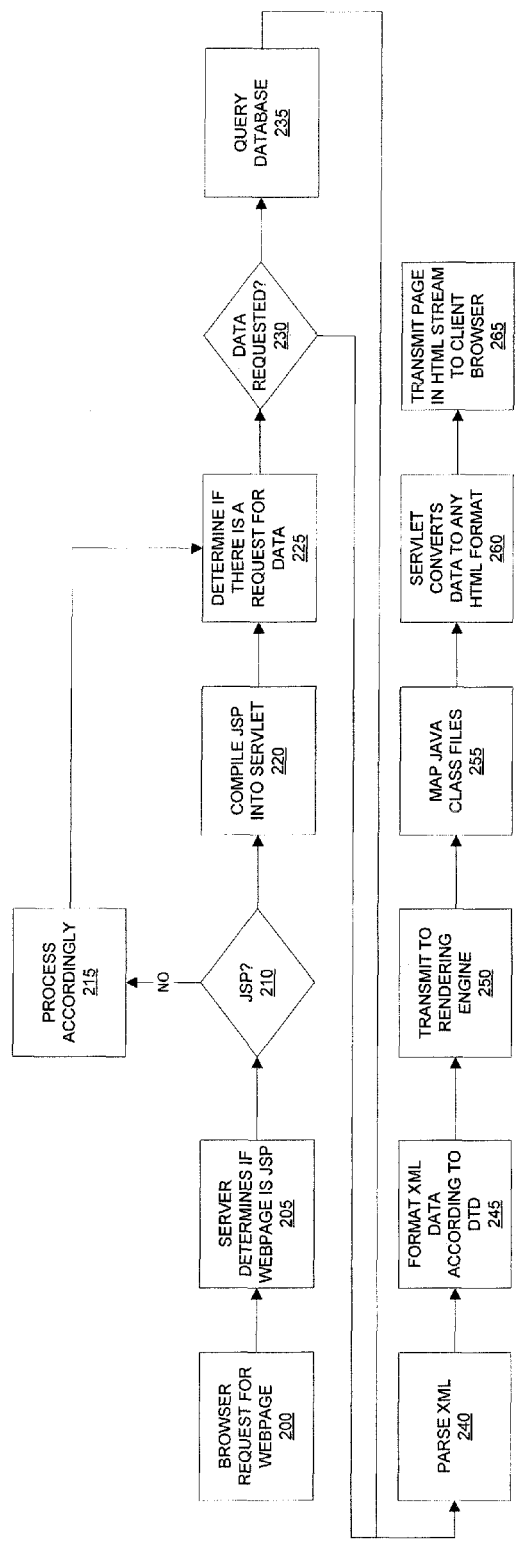

A more complete understanding of the present invention may be derived by referring to the detailed description and claims when considered in connection with the Figures, wherein like reference numbers refer to similar elements throughout the Figures, and:

FIG. 1 is a block diagram illustrating exemplary major system components for a field rendering system; and, FIG. 2 is a flow chart illustrating an exemplary method for rendering of webpage interface elements.

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

System

In general, the invention includes a system and method for rendering fields. In one embodiment, the invention defines a field type within XML and employs a rendering engine 130 to insert the defined field into an HTML document. With reference to FIG. 1, a client computer 100 may be connected to the Internet through a browser application 105 to request a webpage from a web server 110. XML 120, which may contain a tag followed by data identifying a field type, may be extracted from a JSP and processed by a rendering engine 130 which adds the defined field to the JSP before creating an HTML data stream to send back to the requesting browser. A website user may then view and modify data contained within the rendered fields which have been consistently incorporated within one or more webpages. For example, an online banking website may contain a field to collect account number data. There may be several pages or locations throughout the website where account number data may be requested. Facilitating the methods of the prior art, a developer would normally create and/or duplicate code or create multiple references to centralized code in order to create each occurrence of a field. The present invention enables a developer to define field properties through XML, removing the need to repeatedly write field specific code or code references to centralized functions.

Any of the communications, inputs, storage, databases or displays discussed herein may be facilitated through a website having web pages. The teen "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server. The web server retrieves the appropriate web pages and sends the data or applications for the web pages to the IP address. Web services are applications which are capable of interacting with other applications over a communications means, such as the interne. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

As will be appreciated by one of ordinary skill in the art, the present invention may be embodied as a customization of an existing system, an add-on product, upgraded software, a stand alone system (e.g., kiosk), a distributed system, a method, a data processing system, a device for data processing, and/or a computer program product. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Client computer 100 may include any hardware and/or software suitably configured to process instructions from software programs. Client computer 100 includes any device capable of connecting to a network via any known means and exchanging data with one or more other computing devices. Client computer 100 may take the form of a personal computer, although other types of computing units may be used including laptops, notebooks, hand held computers, set-top boxes, cellular telephones, touch-tone telephones and the like. Further, client computer 100 may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

Browser 105 may include any hardware and/or software suitably configured to facilitate viewing and/or interacting with Internet webpages. Browser 105 may reside on any device capable of connecting to a web server 110. Such devices may comprise, for example, a computer, hand-held computer, cellular telephone, kiosk, automobile navigation system and the like.

Web server 110 may include any hardware and/or software suitably configured to send, receive and process data either directly or indirectly through a network connection with browser 105. A web server 110 may facilitate processing of simple webpage requests as well as for those requiring the services of a rendering system 145. A transmission of data to or from a web server 110 may originate from a browser 105 or any other system or component of the rendering system 145. A web server 110 may comprise all or some of the components of a rendering system 145 or may serve to receive routing requests to one or more other systems housing rendering system 145 components. In order to dynamically construct a webpage in response to a browser 105 request, web server 110 may compile code contained within a JSP 115 into a servlet. A web server 110 may operate as a single entity in a single geographic location or as separate computing components located together or in separate geographic locations. Further, web server 110 may send, receive and process data via a data network both to and from one or more Internet servers.

JSP 115 is a component of Sun Microsystems Java 2 platform (J2EE) which is a platform independent programming language and environment. JSP technology provides a simplified method for creating dynamic webpage content while allowing developers to encapsulate HTML for static content and XML within a JSP 115 source page. A JSP compiler residing on a server, compiles a JSP into a servlet which processes any directives scripted into the JSP 115. Practitioners will appreciate that other technologies such as Active Server Pages (ASP) and Hypertext Pre-Processor (PHP) have been developed to address similar issues. JSP is used herein to describe the basic functionality of the rendering system and the invention may serve its intended purpose when used in conjunction with varying technologies with or without minor modifications.

XML 120 is an industry-standard protocol administered by the World Wide Web Consortium (W3C) which defines data format for structured documents. XML 120 uses tags to identify types of data to be formatted within an HTML document. XML 120 also allows developers to define their own formatting standards. For example, a developer wanting to ensure that telephone numbers are formatted consistently throughout their website, may create an XML 120 tag corresponding to "phone_no" which corresponds to an entry in an XML 120 configuration file 125 defining a format for telephone numbers. Configuration file 125 will be discussed in greater detail below. XML 120 data may be extracted from a JSP 115 and formatted in accordance with rules contained within a configuration file 125. XML 120 may also format data derived from a database 140 according to formatting rules. XML 120 data relating to a user interface element, and more particularly a field, may be formatted according to a configuration file 125 and transmitted to a rendering engine 130.

DTD and XML Schema 125 are used in conjunction with an implementation of XML 120. Both DTD and XML Schema 125 serve to provide configuration information to XML 120 as described above in reference to a "configuration file". DTD and XML Schema 125 are different technologies with similar functionality, therefore it will be appreciated that DTD and XML Schema 125 are interchangeable. As used herein, DTD and XML Schema 125 may be referred to simply as, DTD 125. DTD 125 provides data formatting rules based on XML 120 tags. As XML 120 is processed, tags are referenced and matched with corresponding tags within a DTD 125 which is followed by formatting rules.

Rendering engine 130 may be a Java servlet or any other component capable of executing programming instructions. Rendering engine 130 may determine which class files 135 to incorporate within a webpage based on data extracted from XML 120. Rendering engine 130, as used herein, may include any hardware and/or software suitably configured to accept input based on formatting rules and employ the appropriate class files 135 or software components within an HTML document. Rendering engine 130 may comprise one or more servlets or any other programming logic to interpret XML 120 data and construct field components within an HTML document. In another embodiment, a rendering engine 130 may receive additional parameters defining one or more additional field properties for a field component. For example, a rendering engine 130 may receive additional parameters in the form of XML formatting rules defining the background color for a particular field type. Practitioners will appreciate that while specific reference is made toward rendering of field components, other user interface components may be rendered through the same system and method.

Class files 135 may include any software suitably configured to use programming logic to define user interface elements and/or process commands and data. A rendering engine 130 may reference or incorporate class files 135 within a JSP 115 which, when compiled, creates an HTML data stream which may be transmitted from a web server 110 to a browser 105 application. As used herein, class files 135 are program components which define the appearance and behavior of user interface elements, and more specifically, the properties of a field. Class files 135 are most commonly associated with the Java platform, however there are a number of other technologies which encapsulate similar utility to that of a Java class file.

Database 140 may include any hardware and/or software suitably configured to facilitate storage and retrieval of data which may be used within an Internet environment. For simplicity, the database 140 is illustrated and described herein as a single database. One skilled in the art will appreciate that a web server 110 may employ any number of databases in any number of configurations. Further, the database 140 may be any type of database, such as relational, hierarchical, object-oriented, and/or the like. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, carrier, issuer, user or the like. Furthermore, the security information may restrict/permit only certain actions such as accessing, modifying, and/or deleting data sets. In one example, the data set annotation indicates that only the data set owner or the user are permitted to delete a data set, various identified carriers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, carrier data; financial institution data; and/or like data useful in the operation of the present invention. As those skilled in the art will appreciate, customer computer may include an operating system (e.g., Windows NT, 95/98/1000, OS2, UNIX, Linux, Solaris, MacOS, etc.) as well as various conventional support software and drivers typically associated with computers. Customer computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (1002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

The invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions Method Referring now to FIG. 2, the process flow depicted is merely an embodiment of the invention and is not intended to limit the scope of the invention as described above. For example, the steps recited in any of the method or process descriptions may be executed in any order and are not limited to the order presented. It will be appreciated that the following description makes appropriate references not only to the steps depicted in FIG. 2, but also to the various system components as described above with reference to FIG. 1. Further, illustrations of the process flows and the descriptions thereof may make reference to webpages, websites, web forms, prompts, etc. Practitioners will appreciate that the illustrated steps described below may exist in any number of configurations including the use of webpages, web forms, popup windows, prompts and the like. It should be further appreciated that the multiple steps as illustrated and described may be combined onto single webpages but have been expanded for the sake of simplicity. In other cases, steps illustrated and described as single process steps may be broken down into multiple webpages but have been combined for simplicity.

Practitioners will further appreciate that there are a number of methods for displaying data within a browser based document. Data may be represented as standard text or within a fixed list, scrollable list, drop-down list, editable text field, fixed text field, pop-up window, and the like. Likewise, there are a number of methods available for modifying data in a webpage such as, for example, free text entry using a keyboard, selection of menu items, check boxes, option boxes, and the like.

In the description for FIG. 2, common reference is made to the process steps of transacting data transmissions between client computer 100, a web server 110 and any of the components within a rendering system 145. The process steps, whether for transmitting a query, a command, or data to a component within the rendering system 145, may be very similar with only minor variances between them. However, a practitioner will appreciate that the steps as described below may be accomplished through any number of process steps and methods producing similar results. As used herein, "transmit" may include sending electronic data from one system to another over a network connection or among varying components of the same system. Additionally, as used herein, "data" may include encompassing information such as commands, queries, files, data for storage, and the like in digital or any other form.

FIG. 2 illustrates an exemplary method for facilitating the rendering of webpage interface elements. A web browser 105 may facilitate a request for a webpage (step 200), wherein the request may be transmitted to a web server 110 which may process the request and determine whether the webpage is a JSP (step 205). When web server 110 receives a request for a webpage, a web server 110 may determine the type of webpage requested. For example, there are several technologies used to process a webpage such as JSP, HTML, ASP, PHP, etc. A web server 110 may determine how to process a webpage request based on a webpage file extension. In the examples above, the file extension would be either .jsp, .html, .asp or .php, respectively. FIG. 2 presents a high-level view of the processing steps for a JSP webpage. Therefore, a non-JSP webpage may be processed according to its file type (step 215) prior to determining if the webpage includes a request for data (step 225). Practitioners will appreciate that the rendering process as described herein may be adapted to other webpage processing technologies.

If a requested webpage is a JSP (step 210), then a JSP engine may compile the JSP into a servlet (step 220). A servlet is a small program which is executed on a server and will later be used to create an HTML data stream which can be read by a browser application 105. A servlet may include a request for data from a database system (step 225). If there is a request for data (step 230), then a servlet may generate a database query (step 235) to extract the data according to defined parameters. A servlet may also request that data be written to a database to be stored.

The parse XML (step 240) may read and format XML statements from within the servlet. Parsing identifies tags which are used to identify how to format XML data according to a DTD (step 245). A DTD provides specific instructions on how to format various data classes. For example, in a typical implementation of XML, a statement may contain a tag labeled "birthdate" followed by the data to be formatted. A DTD may also contain a tag labeled "birthdate" which would define how the data should be formatted. In an example relating to the present invention, an XML tag may be labeled "account no" and a corresponding tag in a DTD may be followed with a Java class file name such as XTextBox. The class file name may be used by a rendering engine 130 to reference the XTextBox class file in order to display an account number within a standard textbox. Practitioners will appreciate that there are a number of user interface elements which may be represented within class files and employed within the present invention to render those elements within a webpage. Examples of user interface elements may include, for example, a button, check box, radio box, text field, menu, list, drop-down box and the like.

As in the example above, a rendering engine (step 250) may process XML data in order to create a presentation of the data according to its type. A rendering engine 130 may map the class file within a servlet (step 255) in order for the class file to be properly processed when the servlet creates a document in a format that can be read by a browser application 105. The servlet may then convert data to any HTML format (step 260) and transmit the HTML document to a client browser in an HTML stream (step 265). Practitioners will appreciate that a servlet may use any web based technology known in the art to create and deliver electronic documents to a browser application in order to be displayed.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

We claim:
1. A method comprising:
retrieving, by a computing system, an Extensible Markup Language (XML) tag from a web resource in response to a request for the web resource;
matching, by the computing system, the XML tag to a tag in a data type definition (DTD) file to obtain information in the DTD file identifying a first class file for use in rendering a user interface element for the web resource;
mapping, by the computing system, the first class file within a servlet based on the obtained information;

performing a first rendering, by the computing system, of the user interface element for the web resource by executing program code in the servlet based on the first class file;

changing, by the computing system based on user input, the class file identified by the DTD file for the tag from the first class file to a second class file, wherein the DTD file is accessible using XML tags of multiple different web resources;

receiving a second request for the web resource;

matching, by the computing system, the XML tag to the tag in the DTD file to obtain information identifying the second class file; and performing a second rendering, by the computing system, of the user interface element for the web resource for the second request by executing program code based on the second class file, wherein the second rendering uses a different format for the user interface element than the first rendering.

2. The method of claim 1, wherein the different format is a different input format for receiving data via the user interface element.

3. The method of claim 1, further comprising rendering multiple different web resources based on a current class file identified by the DTD file for the tag.

4. The method of claim 1, wherein the executing the program code based on the first class file includes preventing entry of values that do not conform to the first class file.

5. The method of claim 1, further comprising storing the DTD file using a centralized server system that is accessible to multiple application servers.

6. the method of claim 1, wherein the first class file and the second class file are Java class files.

7. The method of claim 1, wherein the first rendering are second rendering are further based on one or more XML parameters in the web resource.

8. A system, comprising:
one or more processors; and
one or more memories having program instructions stored thereon that are executable to perform operations comprising:
retrieving an Extensible Markup Language (XML) tag from a web resource in response to a request for the web resource;
matching the XML tag to a tag in a data type definition (DTD) file to obtain information in the DTD file identifying a first class file for use in rendering a user interface element for the web resource;
mapping the first class file within a servlet based on the obtained information;
performing a first rendering of the user interface element for the web resource by executing program code in the servlet based on the first class file;
changing, based on user input, the class file identified by the DTD file for the tag from the first class file to a second class file, wherein the DTD file is accessible using XML tags of multiple different web resources;
receiving a second request for the web resource;
matching the XML tag to the tag in the DTD file to obtain information identifying the second class file; and
performing a second rendering of the user interface element for the web resource for the second request by executing program code based on the second class file, wherein the second rendering uses a different format for the user interface element than the first rendering.

9. The system of claim 8, wherein the different format is a different input format for receiving data via the user interface element.

10. The system of claim 8, wherein the operations further comprise rendering multiple different web resources based on a current class file identified by the DTD file for the tag.

11. The system of claim 8, wherein the first rendering are second rendering are further based on one or more XML parameters in the web resource.

12. A non-transitory computer-readable medium having instructions stored thereon that are executable by a computing device to perform operations comprising:
retrieving an Extensible Markup Language (XML) tag from a web resource in response to a request for the web resource;
matching the XML tag to a tag in a data type definition (DTD) file to obtain information in the DTD file identifying a first class file for use in rendering a user interface element for the web resource;
mapping the first class file within a servlet based on the obtained information;
performing a first rendering of the user interface element for the web resource by executing program code in the servlet based on the first class file;
changing, based on user input, the class file identified by the DTD file for the tag from the first class file to a second class file, wherein the DTD file is accessible using XML tags of multiple different web resources;
receiving a second request for the web resource;
matching the XML tag to the tag in the DTD file to obtain information identifying the second class file; and
performing a second rendering of the user interface element for the web resource for the second request by executing program code based on the second class file, wherein the second rendering uses a different format for the user interface element than the first rendering.

13. The non-transitory computer-readable medium of claim 12, wherein the different format is a different input format for receiving data via the user interface element.

14. The non-transitory computer-readable medium of claim 12, wherein the operations further comprise rendering multiple different web resources based on a current class file identified by the DTD file for the tag.

15. The non-transitory computer-readable medium of claim 12, wherein the first rendering are second rendering are further based on one or more)ML parameters in the web resource.

* * * * *